(12) United States Patent
Cummins et al.

(10) Patent No.: US 7,555,573 B2
(45) Date of Patent: Jun. 30, 2009

(54) INITIATING SOFTWARE RESPONSES BASED ON A HARDWARE ACTION

(75) Inventors: Charles Cummins, Seattle, WA (US); Chris J. Guzak, Kirkland, WA (US); Cynthia C. Tee, Bellevue, WA (US); Dave Kong, Redmond, WA (US); Gloria F. Boyer, Redmond, WA (US); Mohammed A. Samji, Bellevue, WA (US); Rebecca J. Deutsch, Redmond, WA (US); Stephen J. Scallen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 11/197,533

(22) Filed: Aug. 5, 2005

(65) Prior Publication Data
US 2007/0061495 A1    Mar. 15, 2007

(51) Int. Cl.
*G06F 3/00* (2006.01)
*G06F 13/00* (2006.01)

(52) U.S. Cl. .................... 710/15; 710/62; 711/162; 711/173

(58) Field of Classification Search .............. 710/15, 710/62; 711/162, 173
See application file for complete search history.

(56) References Cited

U.S. PATENT DOCUMENTS 5,956,481 A * 9/1999 Walsh et al. ................. 726/23
6,289,426 B1 * 9/2001 Maffezzoni et al. ......... 711/173
6,356,971 B1 * 3/2002 Katz et al. ................... 710/301
6,529,992 B1 * 3/2003 Thomas et al. ............... 711/1
2001/0045964 A1 * 11/2001 Camara et al. .............. 345/810
2002/0023198 A1 * 2/2002 Kokubun et al. ............ 711/162
2002/0083228 A1 * 6/2002 Chiloyan et al. ............ 710/9
2006/0080471 A1 * 4/2006 Powell et al. ................ 710/6

OTHER PUBLICATIONS

Stephane St-Michel and Brian Aust, Autoplay in Windows XP: Automatically Detect and React to New Devices on a System, Nov. 2001, MSDN Magazine, http://msdn.microsoft.com/en-us/magazine/cc301341.aspx.*

* cited by examiner

*Primary Examiner*—Henry W. H. Tsai
*Assistant Examiner*—Kris Rhu
(74) *Attorney, Agent, or Firm*—Shook, Hardy & Bacon LLP

(57) ABSTRACT

The arrival of a new media volume or newly attached device is detected. The media or device is scanned in order to determine the type, and a complete list of installed software programs registered to handle the media type or device is presented to the user. This list may be generated and displayed while the disk is still being scanned. The user selects a handler for the media type or device, and may also decide if the handler will be the default handler when media type or device is subsequently encountered. The user may check and update the stored user settings to view or edit the default handlers for any media type or device. Additionally, the user is prompted to confirm or change the default handler after another registered handler of that media type has recently been installed on the machine.

7 Claims, 16 Drawing Sheets

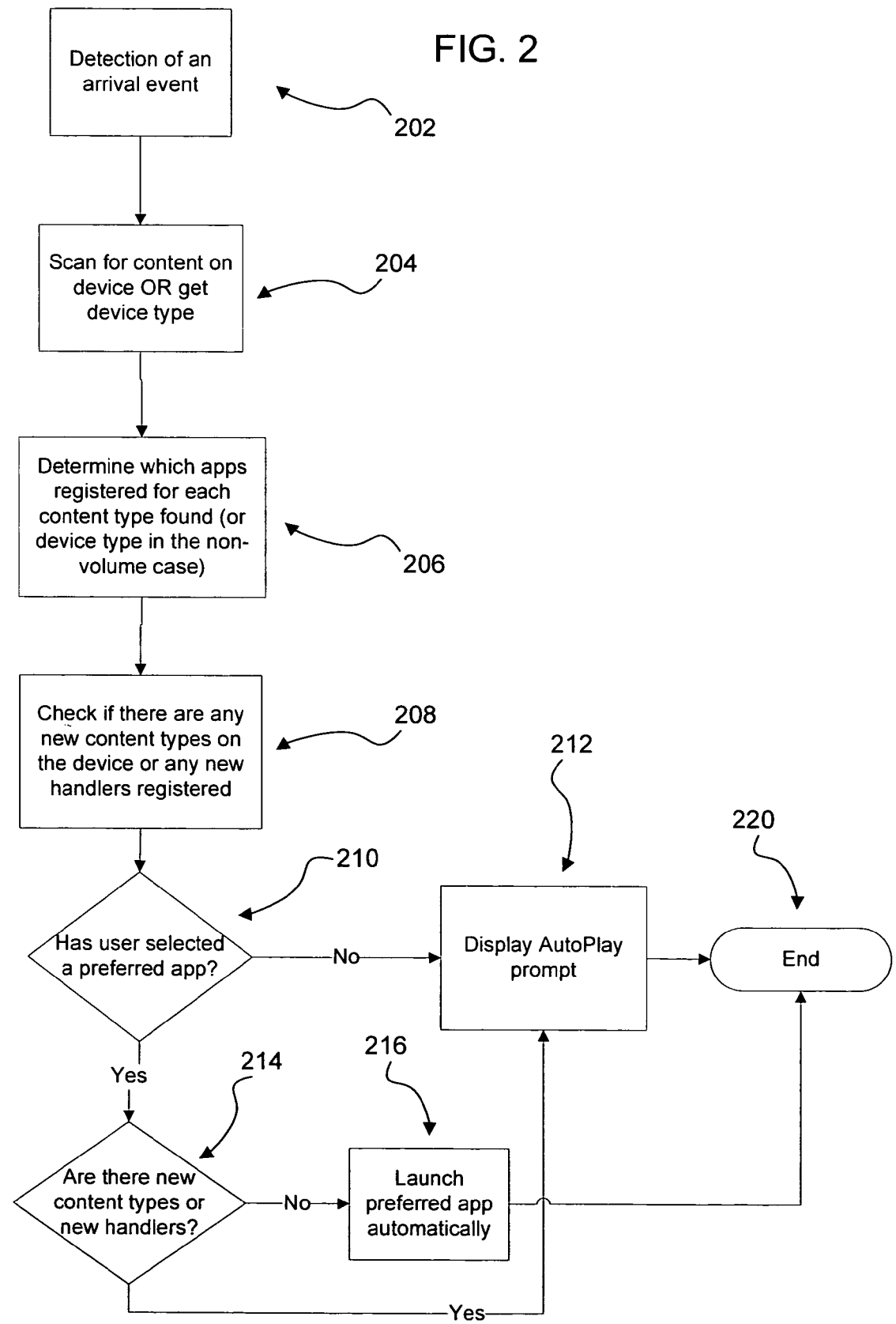

US 7,555,573 B2

INITIATING SOFTWARE RESPONSES BASED ON A HARDWARE ACTION

BACKGROUND

Aspects of this invention relate to selecting and performing a software action automatically in response to the detection of a new electronic media or a device connected to a computer. In recent years, the numbers of electronic formats for media files and documents has grown significantly. As computers have become larger and more powerful tools, they have also attempted to become compatible with these various electronic media and document formats. Computers today will typically support many different methods of creating and storing an electronic document. For example, in a typical personal computer, a user who creates a new image file can store that image as a JPEG, GIF, TIFF, PNG, BMP, or any of several other image formats. This abundance of electronic formats also applies for video files, audio files, and other document types such as word processing documents.

As the number of electronic file formats has grown, so has the number of software programs installed on the typical personal computer able to view and interact with those files. A single computer might have several different software programs each capable of interpreting and/or otherwise interacting with various file formats. For example, a user many have many image viewer and editor programs capable of interpreting and displaying a JPEG image.

A feature named AutoPlay was included as part of the operating system Windows XP made by Microsoft Corporation. This feature detects content, such as pictures, music, or video file types, on removable media (such as a CD-ROM) and removable devices. The AutoPlay feature then automatically launches an application to play or display that content. Despite its benefits, improvements to this feature were possible.

SUMMARY

According to aspects of the invention, software responses are configured to respond to hardware actions initiated by a user on a computer or similar machine such as the arrival of a device or media. Aspects further provide user interfaces enabling the user to facilitate setting and/or changing their preferred default actions for types of devices and media that they insert.

For example, upon detecting the arrival of a new media volume or newly attached detachable device, the computer system may scan the media or device in order to determine its type or a type of files stored on the media or device. The computer system may present to a user a list of installed software programs registered to handle the media type or device. This list may be generated and displayed while the disk is still being scanned, thereby quickly presenting at least one option to the user. The computer system may continue scanning the media or device to determine whether other or additional handler options should be presented to the user for handling the file type(s) on the media or device.

According to another aspect, where a user has previously decided that a handler will be the default handler when the same media type or device is subsequently encountered, and a new handler is present on the system to handle that media type or device, the computer system may present to the user the option of keeping the default handler or using the new handler, regardless of the existence of yet additional handlers capable of handling the media or device on the computer system.

Yet another illustrative aspect includes the use of dynamic handlers, a software application corresponding to the handler has a specific software routine in place to provide information to the AutoPlay software upon the insertion of a compatible media content or device type into the computer.

BRIEF DESCRIPTION OF THE DRAWINGS

FIG. 2 is a flow diagram illustrating the operation of AutoPlay functionality upon the insertion of a media disk into the computer.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
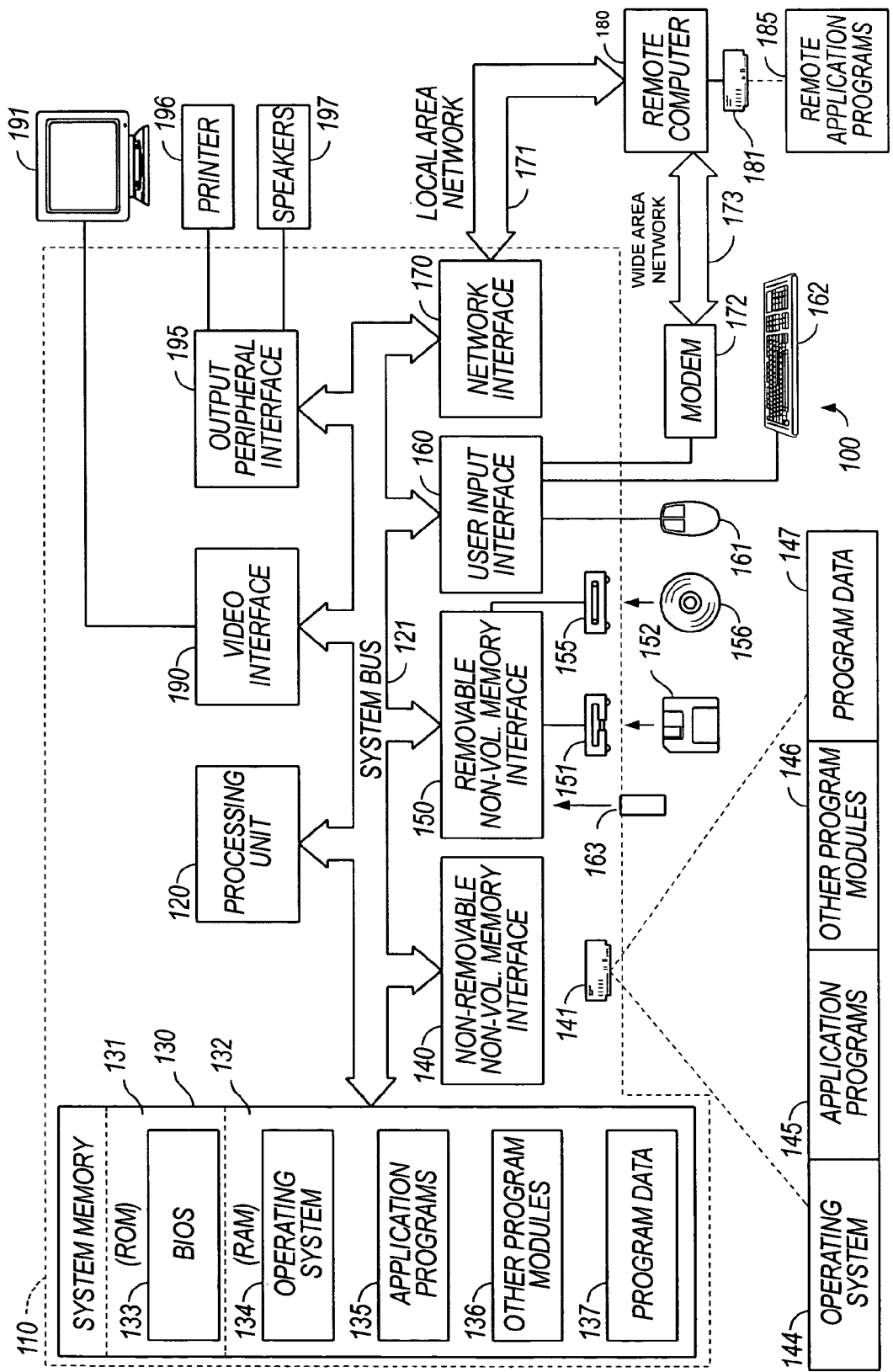
FIG. 1 is a schematic diagram showing an exemplary computer operating environment within which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media; and a magnetic disk drive 151 that reads from or writes to a removable, nonvolatile magnetic disk 152, an optical disk drive 155 that reads from or writes to a removable, nonvolatile optical disk 156 such as a CD-ROM or other optical media, and a detachable USB memory device 163. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

FIG. 1 illustrates an example of a suitable computing system environment 100 on which the invention may be implemented in whole or in part. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

The current disclosure includes numerous inventive aspects related to providing a software response to hardware actions initiated by a user on a computer or similar machine such as the arrival of a device or media. These aspects facilitate the user being able to set their default actions for types of devices and media that they insert. Unless otherwise indicated, each of these aspects may be used independently and/or in combination with any of the other aspects to provide improved and/or different control processes.

FIG. 2 is a schematic flow diagram illustrating the summary of the operation of AutoPlay functionality upon the detection of an arrival of detachable storage device, which may be for example the insertion of a media disk (e.g., disks 152 and 156) or the attachment of a detachable storage device (e.g., USB storage drive 163) to the computer. An "arrival event" is detected at step 202 by the computer's hardware infrastructure and operating system. More specifically, this program will detect and respond to the insertion (arrival) of removable media into fixed devices (for example, but not limited to, internal CD drives or internal ZIP drives) or into removable drives (for example, but not limited to, external CD drives or external ZIP drives). The program will also detect and respond to the attachment (arrival) of removable devices with fixed media (for example but not limited to, a USB Key). However, in an illustrative arrangement, the program will not respond to a non-removable device with fixed media (such as an internal hard drive) because there is no arrival event. For removable devices (such as an external CD drive) with removable media, the program responds to the arrival (e.g., insertion) of the removable media and not the attachment of the device.

Following the detection of an arrival event at step 202, the content type of the media or the specific device is determined by scanning the device 204. As described below, the program continues to provide a user interface with options upon the detection of the content and does not need to wait until the entire media is scanned to provide user options. Indeed, a selection may be made by the user prior to the completion of the scanning step, and such a selection will terminate the scanning process.

A list of handlers that are installed and registered for the media type or device is generated at step 206. Within this list, the handlers are examined at step 208 to determine if any of them are new (i.e. they have been installed since the last time the same content type media or device was inserted into the computer). The program then checks at step 210 whether the user has previously selected a default handler for the media type or device. If there is no default handler for the media type or device, then the AutoPlay prompt dialog is displayed at step 212. If there is a default handler are new content types or new handlers at step 214. If none of the handlers are new 214, then the default handler is called with the media or device at step 216 and the routine is completed at 220. If there is a default handler 210, but one or more of the handlers in the list are new 214, then a modified version of the AutoPlay prompt dialog is displayed at step 212. This version of the AutoPlay prompt dialog includes only the current default handler and the newly installed handlers; it does not include the old handlers, the handlers which were previously presented to the user in the AutoPlay prompt dialog and were not selected as the default handler.

Figure 3A:
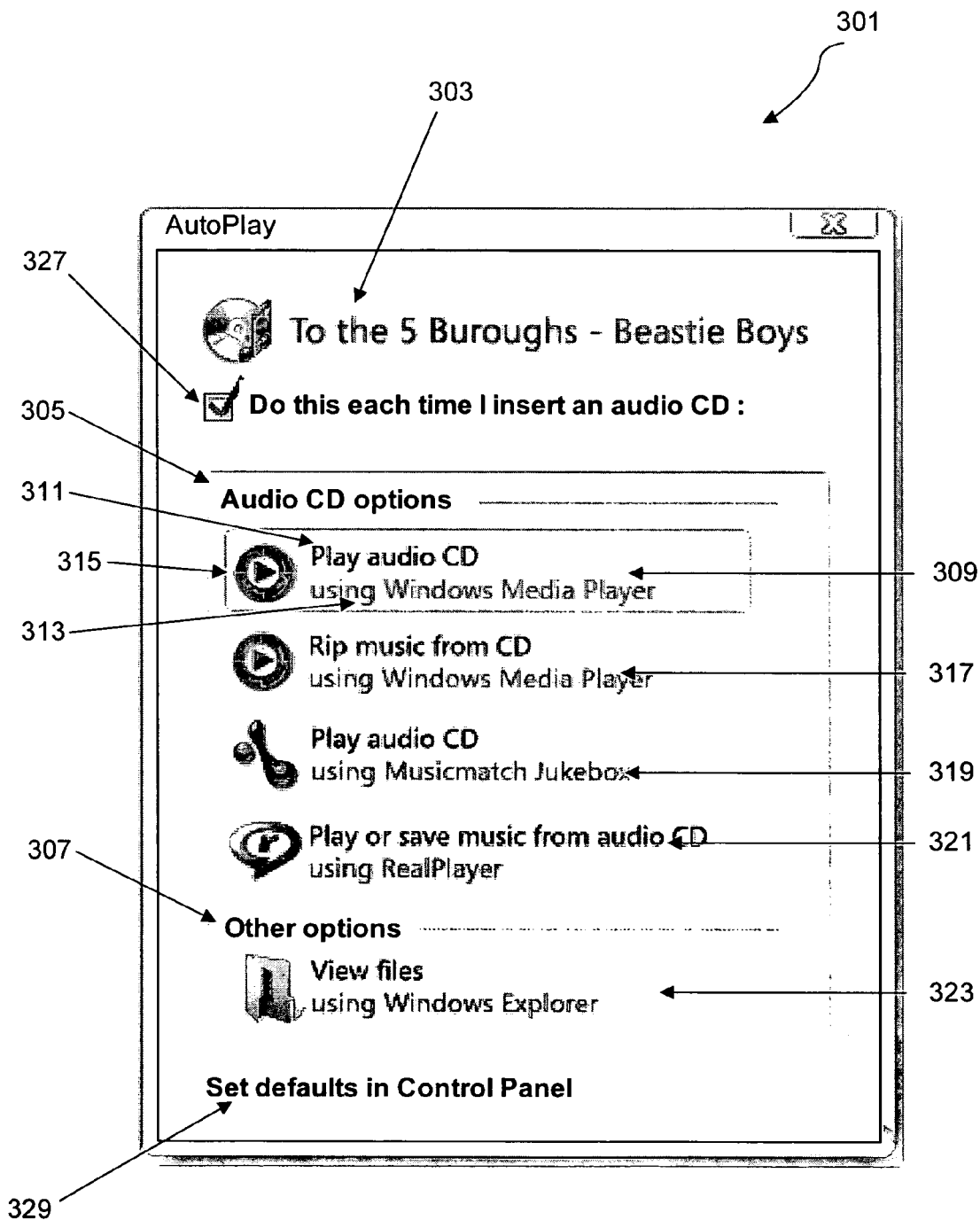
FIG. 3A illustrates a screenshot of a user interface relating to software program handlers based on a computer detecting new media content or a device detachably coupled to the computer, according to one or more illustrative aspects described herein.

FIG. 3A is a screenshot of the AutoPlay prompt dialog user interface 301, used to select a software program to play the recently inserted audio CD, "To the 5 Buroughs," (album title) by the Beastie Boys (artist). In FIG. 3A, an audio CD, or removable compact disk on which a set of audio files are stored, was inserted into the computer's CD-ROM drive. The insertion of the compact disk was detected by the operating system as an arrival event, and the disk was then quickly scanned and recognized as an audio CD. The artist and title of the audio CD are read from the disk, and are displayed at the top of the user interface 303. Since the disk is recognized as an audio CD, the AutoPlay prompt dialog 301 present two lists containing handlers: the "Audio CD options" list 305, and the "Other options" list 307. This user interface 301 would appear the first time media of this type (e.g., an audio CD) is detected as inserted. A similar, or in a situation where media of this type was previously inserted and no default handler has been set.

The "Audio CD options" list 305 contains all the handlers of all software programs installed on the computer and registered to specifically interact with audio CDs. Each handler in the "Audio CD options" list 305 describes an action which will be performed on the audio CD, and the software program that will perform the action. The software program is identified using both the name of the program, and a recognizable icon commonly associated with that program. For example, the first handler 309 in the Audio CD options list 305 contains the text "Play audio CD using Windows Media Player." This option is described to the user with a short description of the action to be taken 311 (i.e. "Play audio CD") in bold font on the first line, a description of the software program to be used 313 (i.e. "Windows Media Player") on the second line, and the recognizable icon 315 (i.e. the Windows Media Icon) associated with the software program, displayed to the left of the text.

Similarly, the second handler 317 in the "Audio CD options" list 305 provides the user an action to perform (i.e. "Rip music from CD"), the corresponding software program which will perform the action (i.e. "using Windows Media Player"), and the icon of the software program. The third option 319 calls the software program "Musicmatch Jukebox" to play the audio CD. The fourth option 321 calls the software program "RealPlayer" to play or save from the audio CD. The icons displayed in the third and fourth handlers are recognizable icons commonly associated with "Musicmatch Jukebox" and "RealPlayer," respectively.

One aspect of the embodiment depicted by FIG. 3A is that a single software program may have multiple handlers. If one program has the functionality to perform multiple actions using a single media type, then multiple handlers are appropriate for that program. For example, Windows Media Player will be called if the user selects option 309, to play the audio CD, or if the user selects option 317, to rip music from the audio CD. In one embodiment, the software programs register themselves as handlers of a media type or device. While this aspect is described with respect to audio CDs, it applies to any insertable media type or device.

Another embodiment depicted by FIG. 3A is that multiple software programs may exist on the computer which are capable of performing the same action on the same media type or device. For example, the user can play the audio CD with Windows Media Player by selecting handler 309, with MusicMatch Jukebox by selecting handler 319, or with RealPlayer by selecting handler 321. While this is described with respect to audio CDs, it applies to any insertable media type or device.

The "Other options" list 307 provides the user with the general, or not type specific, handlers which are registered to interact with the audio CD. While an audio CD may, of course, be played as such, it may also be viewed as a file system hierarchy, just like any other logical disk drive containing files. Thus, handler 323 allows the user to "View files using Windows Explorer." This handler, like the handlers in the "Audio CD options" list 305, describes the action the handler will initiate (i.e. "View files"), the software program which will be called to perform the action (i.e. "Windows Explorer"), and displays an icon commonly recognized with the software program. Since the action of exploring files is not specific to audio CDs, this handler is placed in the "Other options" list 323, rather than in the "Audio CD options" list 305.

In one embodiment, the handler software programs are shown listed in the order that they were installed on the computer. For example in FIG. 3A, Windows Media Player was installed before Musicmatch Jukebox, which was installed before RealPlayer. Also, when a new media type or device is inserted into the computer for the first time, the first option in the type-specific list is highlighted. In reference to FIG. 3A, the first handler in the "Audio CD options" list 305 is highlighted, because "Audio CD options" is the type-specific handler list. Thus, handler 309 in FIG. 3A is initially highlighted in the AutoPlay prompt dialog 301 because its software program was installed before the other software programs in the list. Note that even if the software program Windows Explorer, the first option in the "Other options" list 323, was installed before Windows Media Player, handler 323 is not initially highlighted. The handler initially highlighted will be the first handler in the type-specific handler list, if present, for any media type or device.

The "Set Default" checkbox 327 near the top of the AutoPlay prompt dialog 301 enables the user to set the default handler for the current media type or device. When the "Set Default" checkbox 327 is checked, the user's subsequent handler selection will become the default, and will happen automatically the next time the same media type or device is inserted into the computer. For example, when the user clicks handler 309 ("Play audio CD using Windows Media Player"), the AutoPlay prompt dialog 301 will disappear, Windows Media Player will be started, and the audio CD will be played. When the same user subsequently inserts another audio CD into the computer, that CD will automatically be played in Windows Media Player, and the user will not be shown the AutoPlay prompt dialog 301. In one embodiment, the "Set Default" checkbox 327 is checked by default to minimize the number of user actions required to set a default handler. In this embodiment, the user can set a default handler for a media type or device with only a single click.

At the bottom of FIG. 3A, a link to the control panel 329 opens the AutoPlay control panel, where the default handlers for all media types and devices can be viewed and updated. This link 329 also serves to remind users that the default handlers for all media types can be updated through the AutoPlay control panel at a later time.

Figure 3B:
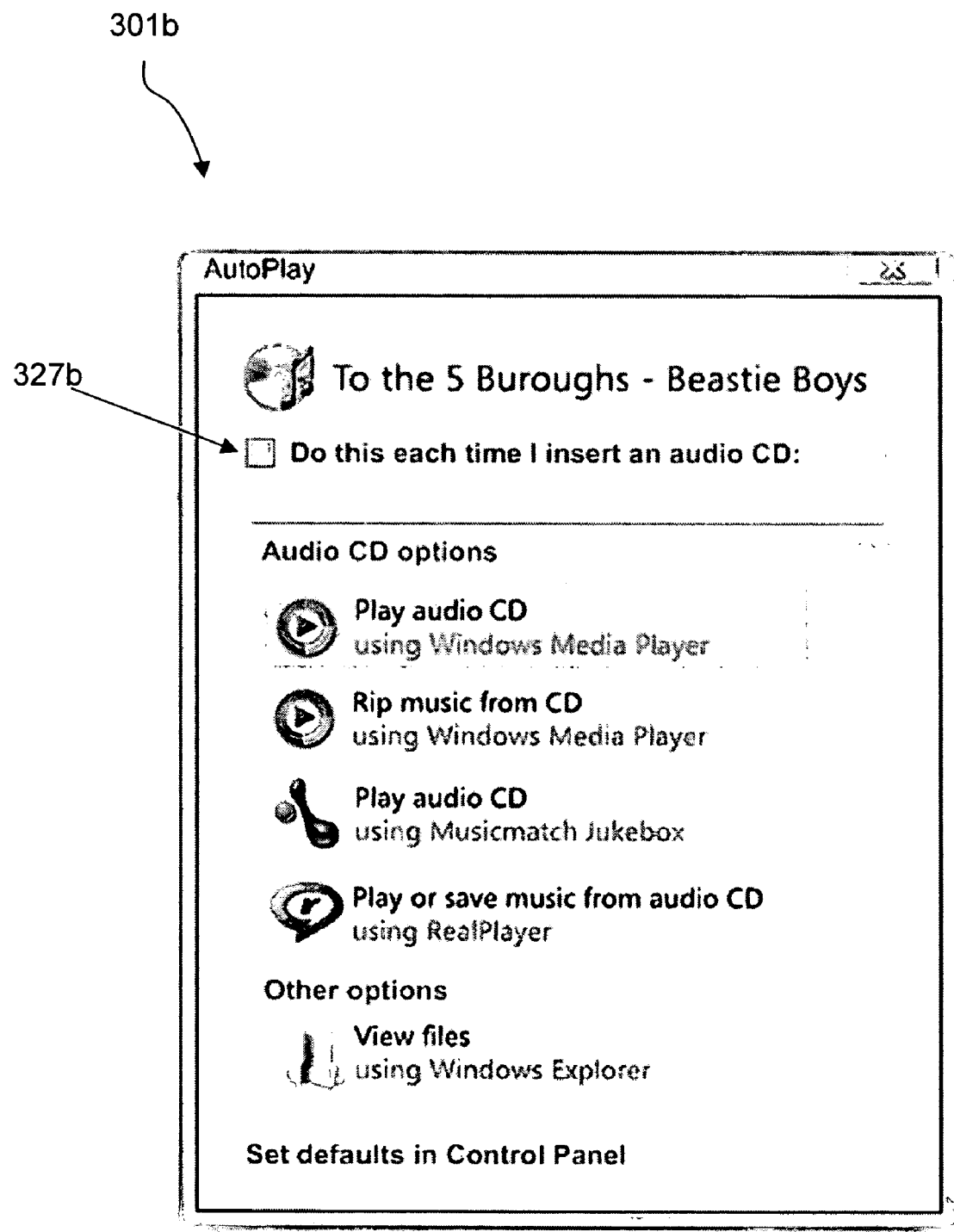
FIG. 3B illustrates a screenshot of a user interface relating to software program handlers based on a computer detecting new media content or a device detachably coupled to the computer, according to one or more illustrative aspects described herein.

In certain embodiments of the invention, the user can choose not to set a default handler for a media type. As discussed above, the AutoPlay prompt dialog and the AutoPlay control panel allow users to explicitly not choose a default handler, or to remove a previously chosen default handler. Referring to the AutoPlay prompt dialog user interface 301b of FIG. 3B, the user has unchecked the "Set Default" checkbox 303. If the user selects a handler while this checkbox 327b remains unchecked, no default handler will be set. Thus, the next time the user inserts an audio CD, the AutoPlay prompt dialog 301b from FIG. 3B will be presented to the user with the "Set Default" checkbox 327b unchecked. The user will once again be allowed to choose from all available registered handlers to play the new audio CD. At this point, to set a default handler, the user will need to recheck the checkbox 303 before selecting a handler from the list.

According to another aspect of the invention, the user may press a "hot-key" in conjunction with the insertion of a media disk or device, to ensure that the AutoPlay prompt dialog will be presented. In this embodiment, even if a default handler has been previously selected for a certain media type, using any of the methods described in detail previously and hereafter, the user may press a designated key on the computer's keyboard at or near the same time that a media disk or device is inserted into the computer. This combination of the new media or device insertion and pressing the hot-key will preempt any AutoPlay default settings previously defined. The default handler, if there is one, will not be called, and instead the AutoPlay prompt dialog, similar to that shown in FIG. 3A will be presented to the user.

These features and others described herein allow for a richer and more coherent user experience with respect to AutoPlay behavior. The methods described allow a user to easily and effectively designate a specific software response to the insertion of a broad range of media content and device types. As shown above, with a single keystroke, a user can set a permanent default software handler for a media content type or device. As will be described below, using the AutoPlay control panel user interface, a user can quickly view and edit all of the default handlers which can be set on the computer. Additional features, such as the hot-key described above, allow users to further customize AutoPlay behavior and provide powerful user tools with a simple user experience.

Figure 4:
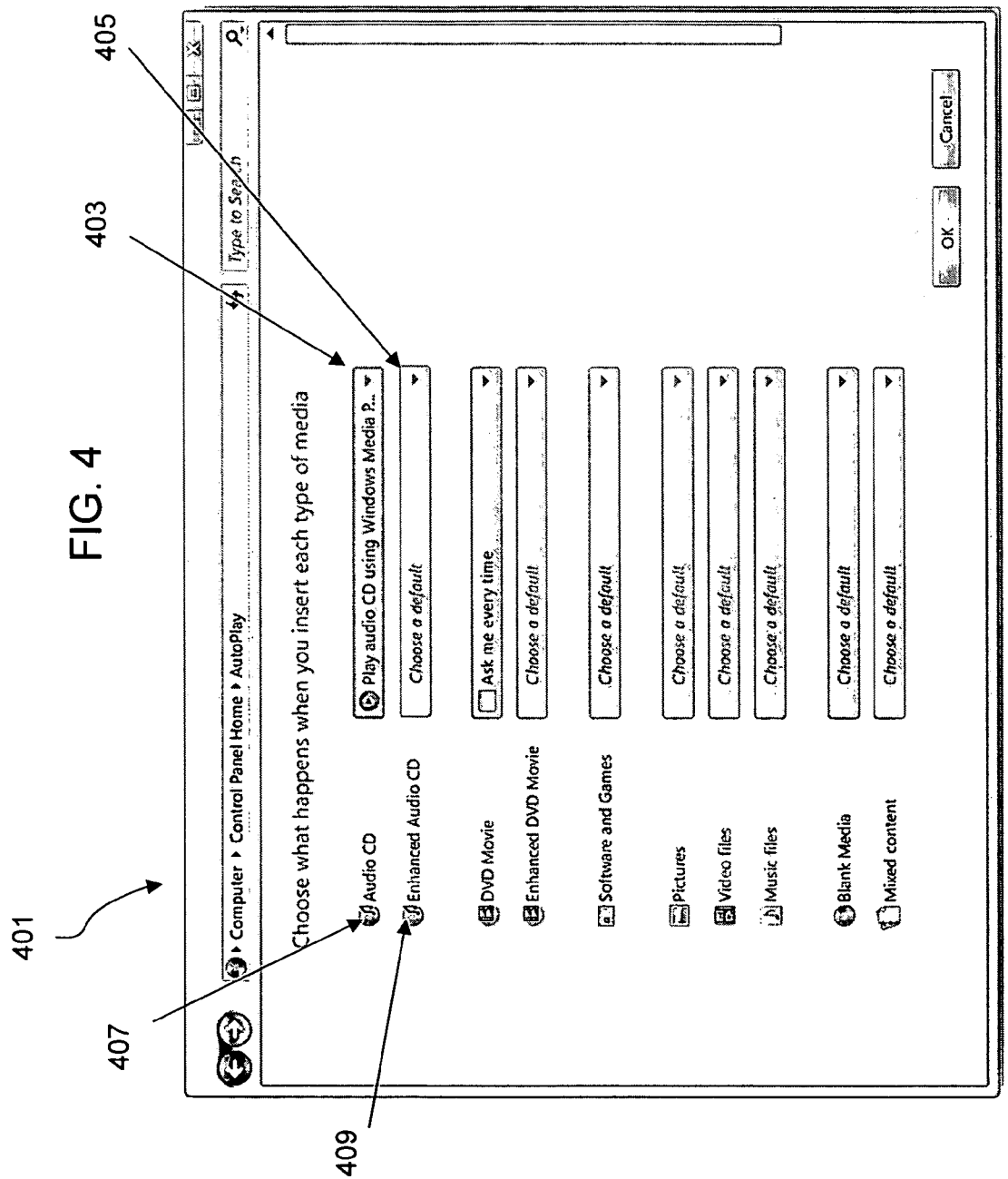
FIG. 4 illustrates a screenshot of a user interface relating to setting default software program handlers based on a computer detecting new media content or a device detachably coupled to the computer, according to one or more illustrative aspects described herein.

FIG. 4 is a screenshot of an AutoPlay control panel user interface 401. In one embodiment, the user can access the AutoPlay control panel 401 through the operating system's control panel or the control panel link in the AutoPlay prompt dialog (e.g. link 329 in FIG. 2). The left side of the interface lists all of the media types which may apply to volume devices. A volume device is any device or media which is can be exposed to the computer's operating system as a file system. Volume devices include removable disk drives, hard disk drives, mass storage devices, and some mobile devices such as PDAs and phones.

Returning to FIG. 4, Audio CD is the first content type shown in the AutoPlay control panel 401. For reference, the following is a list of supported media types, in one embodiment of the invention:

Audio files
Pictures
Video files
Mixed content
Software and games
Audio CD
Enhanced audio CD
DVD movie
Enhanced DVD movie
DVD audio
Video CD movie
Super video CD movie
Blank CD To the right of each media type is a dropdown menu control 403 of possible default handlers. If a media type has a default handler already set, that handler will be selected and displayed in the corresponding dropdown. For example, dropdown 403 indicates the user has chosen a default handler for Audio CD media type 407 (e.g. "Play audio CD using Windows Media Player"). The dropdown 405, corresponding to the "Enhanced Audio CD" media type 409, displays the text "Choose a default." This text, implemented as hint text for the dropdown object, indicates that the user has not chosen a default handler for this media type.

Figure 5:
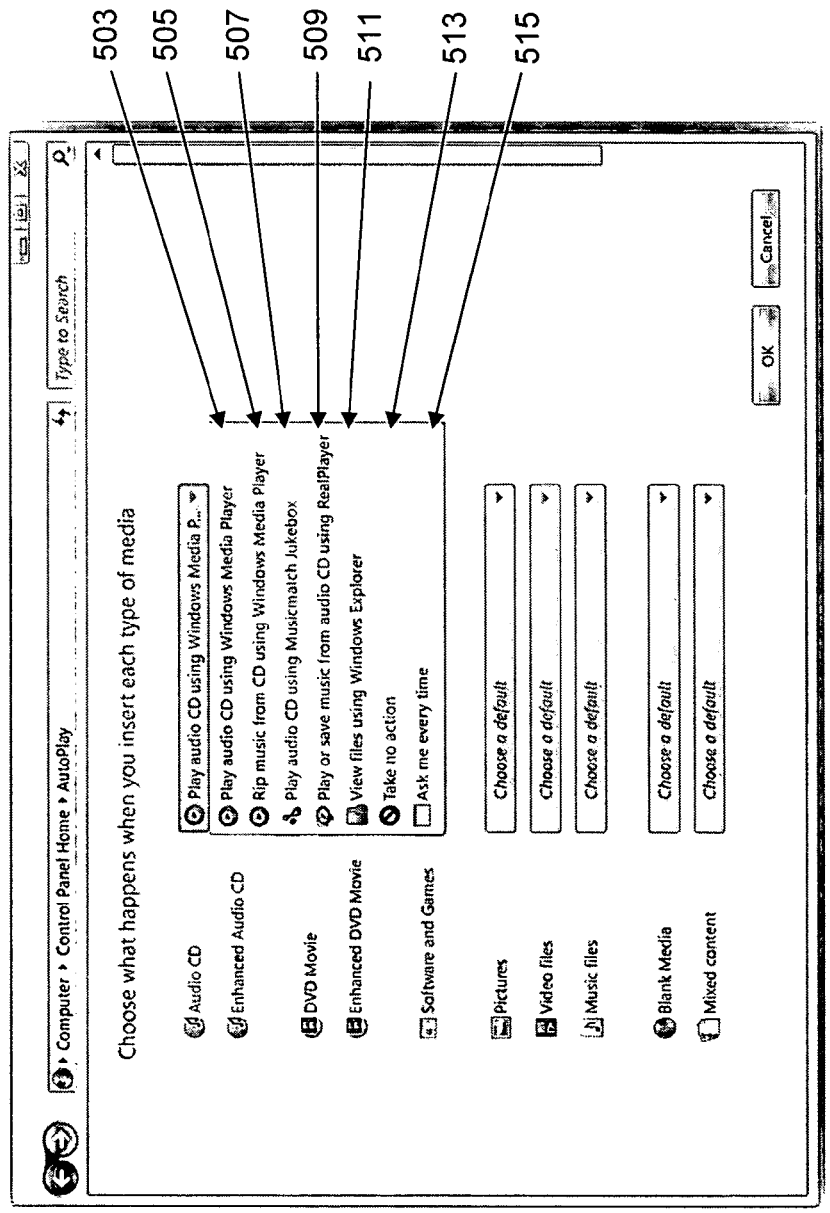
FIG. 5 illustrates a screenshot of a user interface relating to setting default software program handlers based on a computer detecting new media content or a device detachably coupled to the computer, according to one or more illustrative aspects described herein.

FIG. 5 is another screenshot of the AutoPlay control panel 501. In FIG. 5, the dropdown corresponding to the "Audio CD" media type is expanded, allowing the user to choose from the possible default handlers 503-511 for this media type. As in the "Audio CD options" list 305 of FIG. 3A, each default handler consists of an action and the software program that will be called to take that action. Each handler also displays a recognizable icon associated with its software program. Handlers 503, 505, 507, 509, and 511 correspond to the handlers 309, 317, 319, 321, and 323 in AutoPlay prompt dialog shown in FIG. 3A.

However, the expanded dropdown menu in FIG. 5 contains two items not present in the AutoPlay prompt dialog lists. These two items, shown at the bottom of the expanded dropdown represent user preferences that are not default handlers for a media type. Option 513 (i.e. "Take No Action") indicates that no action should be taken upon the insertion of a new audio CD. If "Take No Action" 513 is selected, then the next time an audio CD is inserted no software program will be called, nor will the AutoPlay prompt dialog be presented to prompt the user to choose a handler. Option 515 (i.e. "Ask me every time") indicates that no default handler will be set, but the user will be prompted each time a new audio CD is inserted with the AutoPlay prompt dialog shown in FIG. 3A.

After a user has chosen a default handler, the corresponding software program will be called whenever that media type is encountered, until the default handler is changed by the user in the AutoPlay control panel, as shown in FIG. 5, or until installation of a new software program registered for the media type. When a new software program registered to interact with the media type is installed, the user will have an opportunity to set this new program as the default. However, in the arrangement as shown, there is no need to once again present the user the entire list of programs registered on the machine. Rather, it is faster and more convenient if the user is only presented with the choices of the existing default handler and the handler for the newly installed program.

Figure 6:
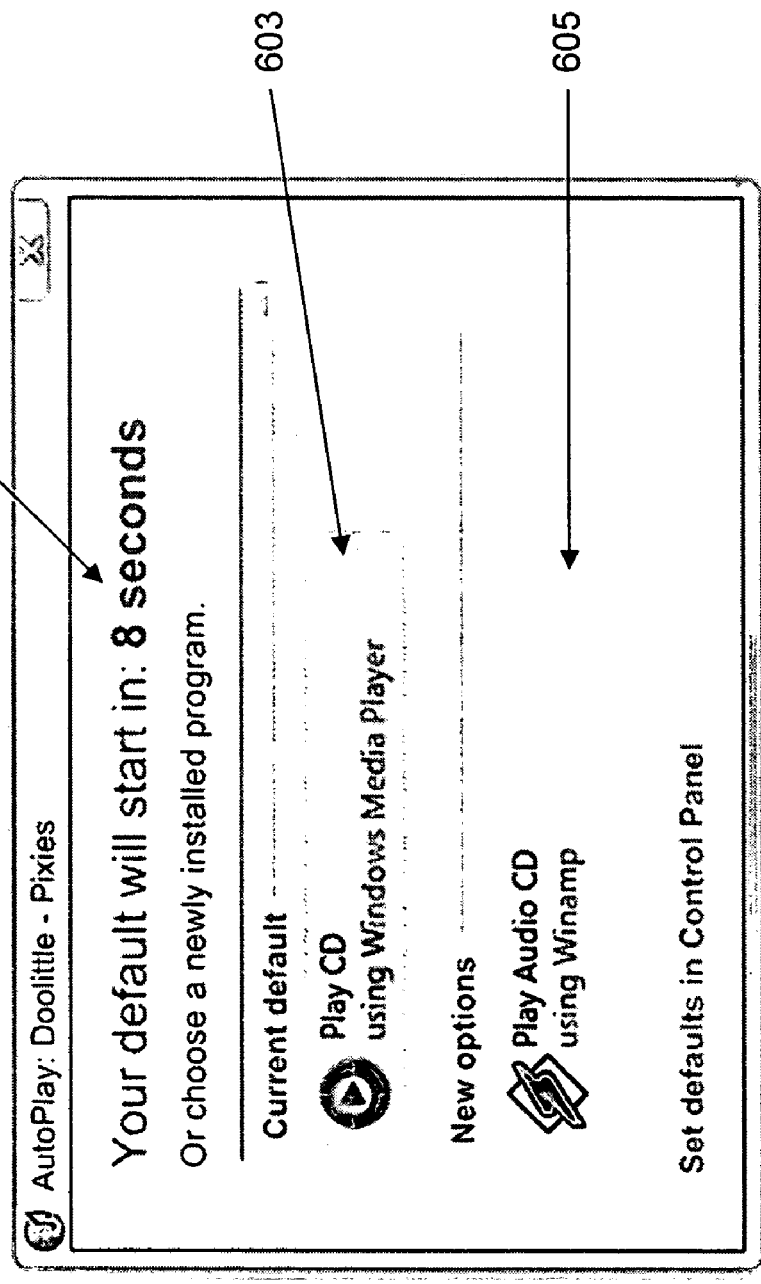
FIG. 6 illustrates a screenshot of a user interface relating to software program handlers based on a computer detecting new media content or a device detachably coupled to the computer, according to one or more illustrative aspects described herein.

FIG. 6 is a screenshot showing this embodiment. This AutoPlay dialog shows a smaller list of the possible default handlers than the Audio CD options list 305 of FIG. 3A. Although a plurality of audio CD playing software is installed on the machine, only two options are presented in this AutoPlay prompt dialog 601. The current default handler 603 (i.e. "Play CD using Windows Media Player") is displayed and highlighted at the top of the list. A new handler 605 (i.e. "Play Audio CD using Winamp") corresponds to a new software program, Winamp, which was recently installed on the computer and is also capable of playing audio CDs. By recently installed, it is meant that the software program has been installed since the last time a disk of this media content was inserted into the computer. The Autoplay user interface 601 is presented for a predetermined period of time. A timer 609 counts down the seconds before the highlighted option is automatically selected. Thus, if the user takes no action in this AutoPlay prompt dialog 601 during the predetermined period of time, the default handler will remain the same and the application corresponding to the default handler will be launched. However, if the user clicks the new handler 605 before the timer 607 reaches zero seconds, then the audio CD will be played using Winamp and the default handler for the audio CD media type will be changed to "Play Audio CD using Winamp." If the user clicks on the current default handler 605, the audio CD will immediately be played using Windows Media Player and the default handler for the audio CD media type will remain unchanged.

As was shown in FIGS. 4-5, once a default handler is set, the user can change or remove the default using the AutoPlay control panel 401. In one embodiment, the user initiates the AutoPlay control panel 401 through the computer's control panel. Once the AutoPlay control panel 401 is presented, the user clicks the dropdown of the desired media type, selects the "Ask me every time" option, and clicks "OK" to remove the default handler from that media type.

Although the embodiments discussed so far relate to audio CDs, the present invention is not limited as such. Any media type which can be stored on a disk, or any device which can be detected by a computer, may be compatible with the present invention.

Figure 7:
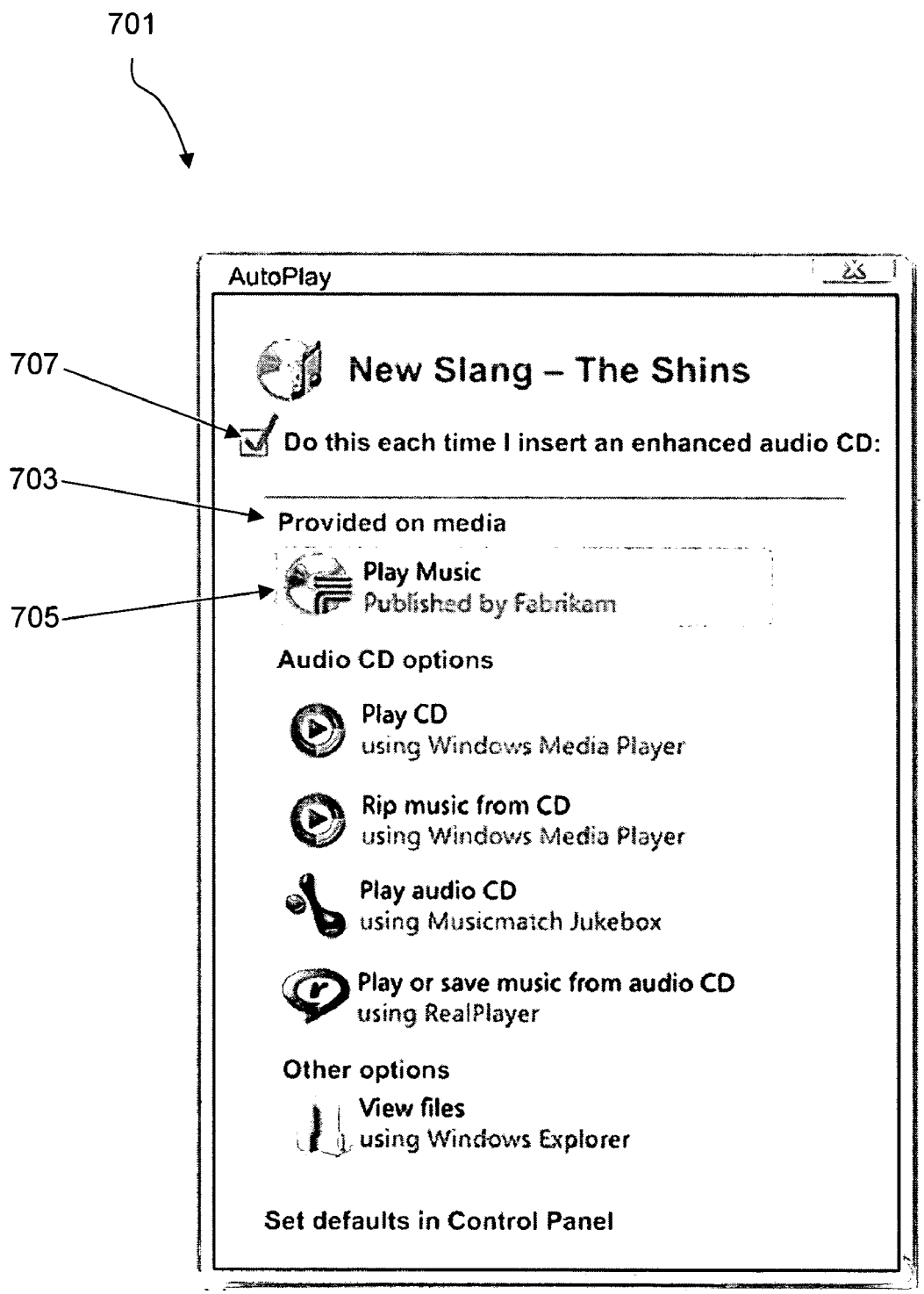
FIG. 7 illustrates a screenshot of a user interface relating to software program handlers based on a computer detecting new media content or a device detachably coupled to the computer, according to one or more illustrative aspects described herein.

For example, referring to FIG. 7, the user has inserted media with enhanced content, such as an enhanced audio CD, into the CD-ROM drive of the computer. An enhanced audio CD differs from a normal audio CD in that it has its own executable software program, often referred to as an AutoRun file. When the computer detects the new media, and identifies the new media as an enhanced audio CD, the AutoPlay prompt dialog 701 is presented. Instead of immediately playing the media with the AutoRun executable provided, the user may choose a handler, and set this handler as the default if so desired. If no default handler has previously been set for the enhanced CD media type, an AutoPlay prompt dialog 701 is provided which includes a default handler provided on the media 703, and a list 709 of other compatible handlers 711-717, as previous described. The first list presented in the AutoPlay prompt dialog 701 is the "Provided on media" list 703, containing the AutoRun executable program provided with the media. This list 703 has a single handler 705 (i.e. "Play Music Published by Fabricom"), which is highlighted and placed at the top of the AutoPlay prompt dialog 701, in one embodiment of the invention. If the user chooses this handler 705, while leaving "Set Default" checkbox 707 checked, then the AutoRun executable program provided on the media will be called. Further, because "Set Default" checkbox 707 is checked, the AutoRun program provided on the enhanced media will be set as the default handler. Thus, the next time an enhanced CD is inserted by the user, regardless of the publisher or the specific AutoRun file on the disk, the AutoRun executable on the CD will automatically be called. If the user unchecks the "Set Default" checkbox 707 before selecting a handler, then the AutoPlay prompt dialog 701 will again be displayed the next time an enhanced audio CD is inserted into the computer. While not shown, a similar process may be used for other media with enhanced content such as enhanced DVD movies.

Figure 8:
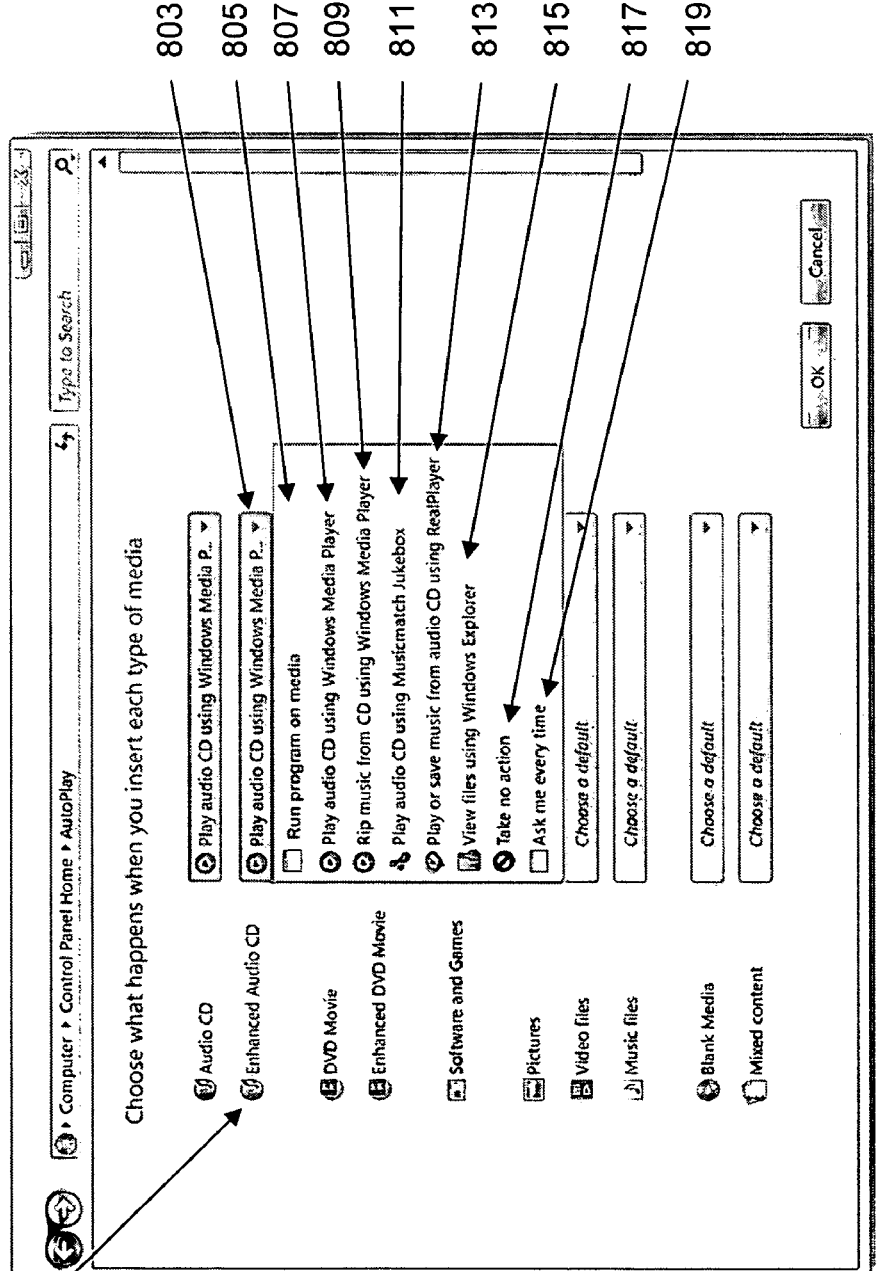
FIG. 8 illustrates a screenshot of a user interface relating to setting default software program handlers based on a computer detecting new media content or a device detachably coupled to the computer, according to one or more illustrative aspects described herein.

FIG. 8 shows the AutoPlay control panel 801, in a similar embodiment to that which was shown in FIGS. 4 and 5. In FIG. 8, the default handler for enhanced audio CDs 802 is set to "Play audio CD using Windows Media Player." However, the user has now clicked the Enhanced Audio CD dropdown 803, and can set the default to any of the handlers displayed in that dropdown. As in the AutoPlay prompt dialog 701 of FIG. 7, the AutoRun executable program provided on the media is the displayed at the top of the handler list. Using the AutoPlay control panel 801, the user may choose the provided executable 805 as the default handler, either of the Windows Media Player handlers 807-809, or one of the other installed software programs registered for enhanced audio CDs 811-813. The user may also set the default action to interface with the files of the enhanced audio CD using Windows Explorer 815, or set the default to take no action 817. Finally, the user may choose to remove the default 819, so that the AutoPlay prompt dialog will be displayed when subsequent enhanced CDs are inserted into the computer.

Figure 9:
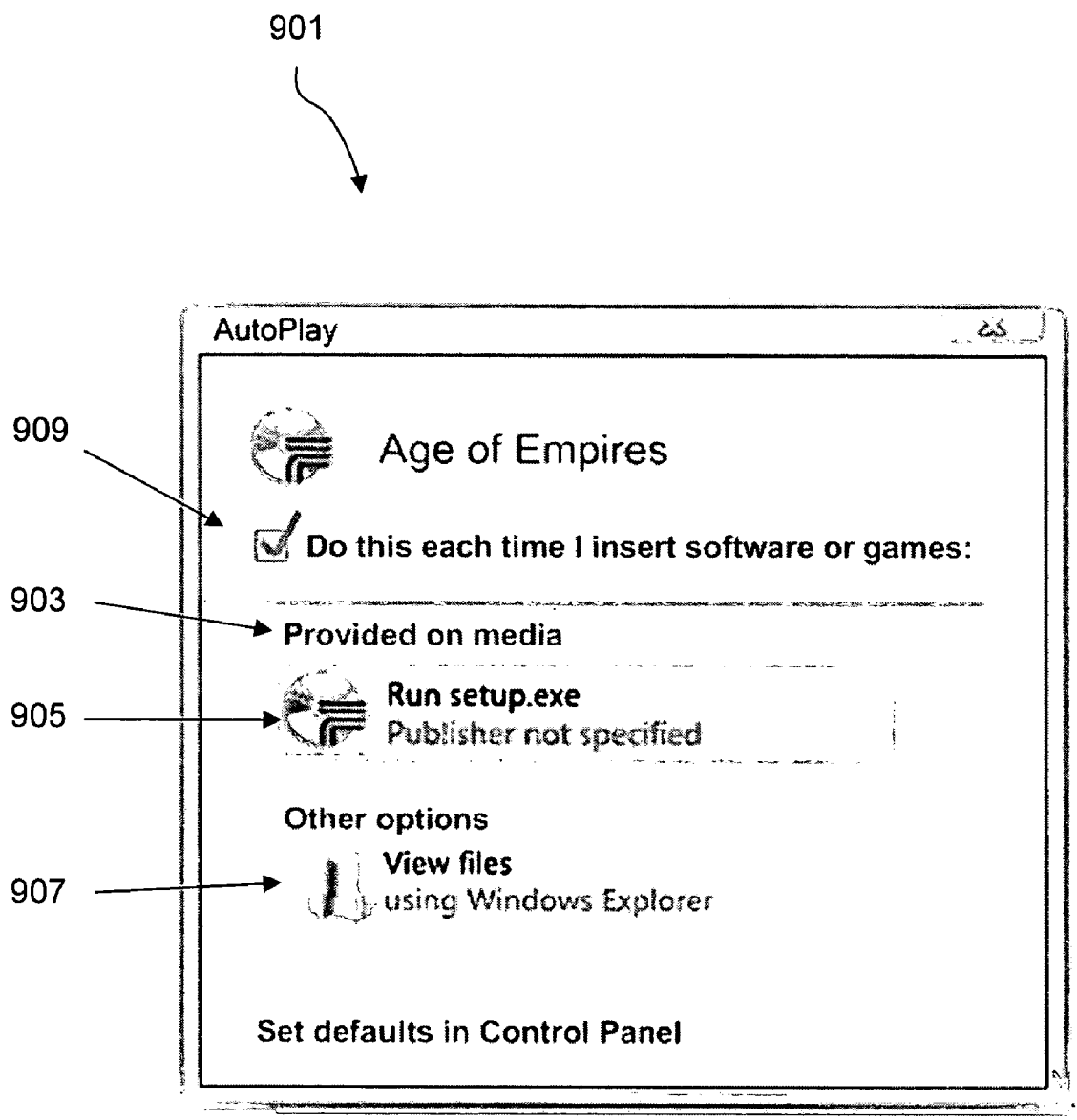
FIG. 9 illustrates a screenshot of a user interface relating to software program handlers based on a computer detecting new media content or a device detachably coupled to the computer, according to one or more illustrative aspects described herein.

FIG. 9 shows another embodiment of the AutoPlay prompt dialog 901 associated with the detection of software and games. In FIG. 9, the user has inserted the game CD "Age of Empires" into the CD-ROM drive of the computer. As with any new detected media type, an embodiment of the AutoPlay prompt dialog 901 is presented. The "Provided on media" list 903 contains only the "Run setup.exe" handler 905. If the "Run setup.exe" handler 905 is selected, the executable setup program on the CD is started. This setup program may attempt to install new software onto the computer, and if security privileges are not necessary for the installation the new software, the setup program will immediately begin the "Age of Empires" installation. If the user does not want to install the software game, another handler 907 allows the user to first view the files using Windows Explorer.

In an illustrative embodiment, and as discussed in relation to FIG. 3A and FIG. 7, the "Set Default" checkbox 909 is checked automatically. If the user leaves the "Set Default" checkbox checked and then selects the "Run setup.exe" handler 905, subsequent software and game CDs inserted into the computer will be installed automatically without the AutoPlay prompt dialog 901 being presented. For example, if the user later inserts another software game installation CD, the installation program will automatically launch. However, if the user leaves the "Set Default" checkbox 909 checked and selects the explore handler 907, subsequent software and game CDs will automatically be opened with Windows Explorer. As discussed above, if the user unchecks the "Set Default" checkbox 907, the AutoPlay prompt dialog 901 will be displayed again when subsequent software or game CDs are inserted into the computer.

In reference to FIG. 9, in one embodiment of the present invention, certain media types will not be searched to determine if they contain mixed content media. For example, software or game CDs inserted into the computer (e.g. Age of Empires, Adobe Illustrator, etc.) will likely contain audio and image files. However, the software or game CD will not be searched for audio and image files, and audio player handlers or image viewer handlers will not be shown as handler options in the AutoPlay prompt dialog 901. Rather, only the AutoRun, or setup executable program provided on the media, and the general option handlers are available. Thus, the only other handler provided in the AutoPlay prompt dialog 901 is the Windows Explorer handler 907. Similarly, besides any AutoRun or setup executable programs provided on the media, only the general default handlers and options are displayed in the "Software and Games" media type dropdown of the AutoPlay control panel. In one embodiment, these general handlers and options are the same as the bottom three options in the Enhanced Audio CD dropdown 803 of FIG. 8, view files using Windows Explorer 815, Take no action 817, and Ask me every time 819.

Figure 10:
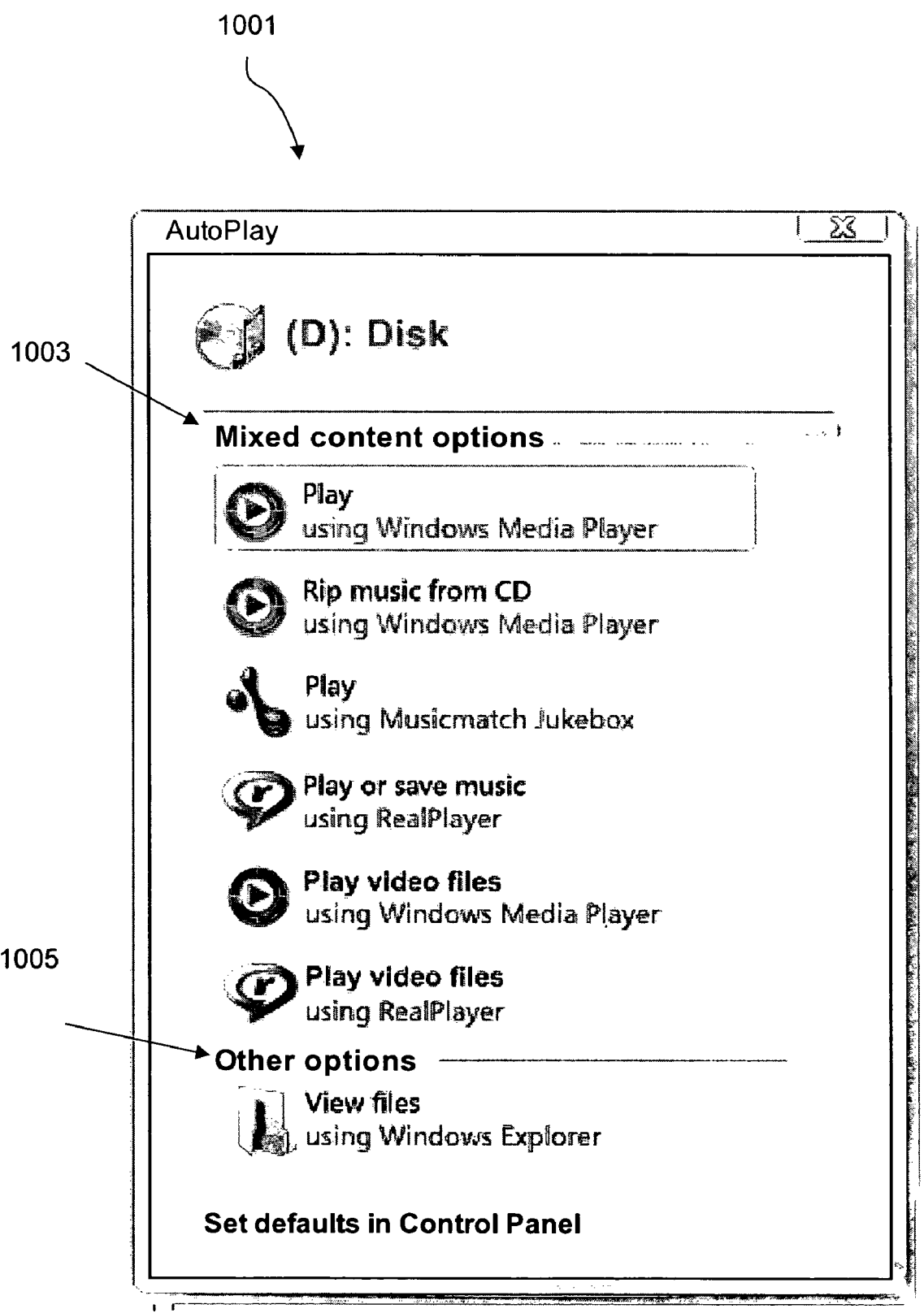
FIG. 10 illustrates a screenshot of a user interface relating to software program handlers based on a computer detecting new media content or a device detachably coupled to the computer, according to one or more illustrative aspects described herein.

In FIG. 10, the user has inserted a mixed content media disk into the CD-ROM disk drive of the computer. A mixed content media disk may consist of multiple types from the set of image files, music files, video files, and various other document types. As with any new inserted media, an embodiment of the AutoPlay prompt dialog 1001 is presented. The "Mixed content options" list 1003 is populated with any handler registered to interact with any of the media types found on the CD. For example, for a mixed media content CD containing both audio files and video files, all of the audio player handlers and all of the video player handlers will be presented in the "Mixed content options" list 1003. Below the "Mixed content options" list 1003, the "Other options" list 1005 contains the general handlers and options.

In another embodiment, the AutoPlay prompt dialog contains no "Set Default" checkbox for mixed content media disks. In other words, no default handler is permitted for mixed content media. The rationale behind this is that subsequent mixed content disks may contain entirely different media types. Therefore, a previously selected handler may not be registered for any media contained in the subsequent media CDs.

Figure 11:
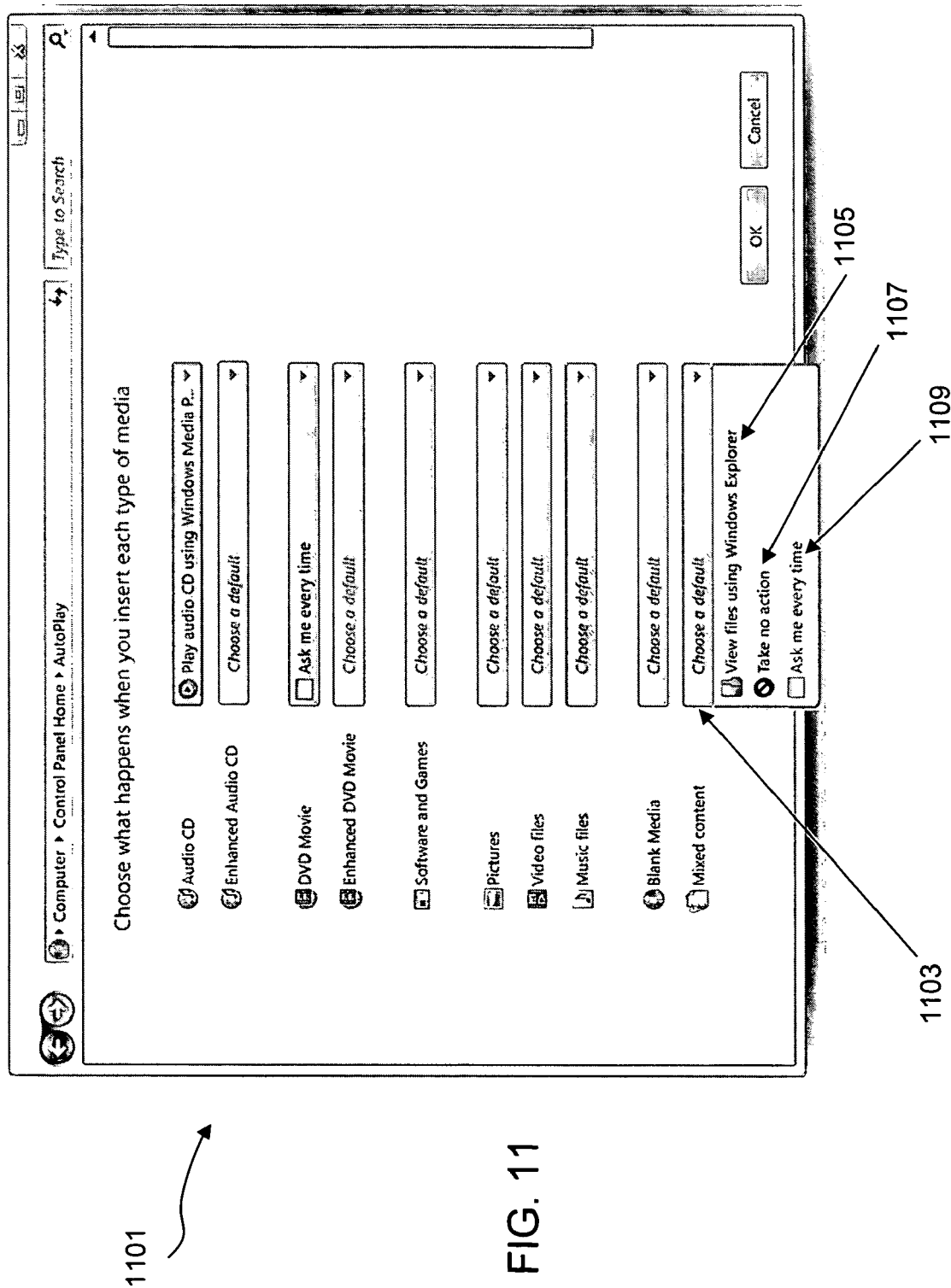
FIG. 11 illustrates a screenshot of a user interface relating to setting default software program handlers based on a computer detecting new media content or a device detachably coupled to the computer, according to one or more illustrative aspects described herein.

FIG. 11 is a screenshot showing the dropdown menu control 1103 in the AutoPlay control panel 1101 for a mixed content media disk. As discussed above, no media type-specific default handler may be selected for mixed content media. Thus, only the general handlers and options are available as defaults for the mixed content media type, and the only options provided in the mixed content dropdown menu 1103 are the Windows Explorer option 1105, Take no action 1107, and Ask me every time 1109.

Figure 12:
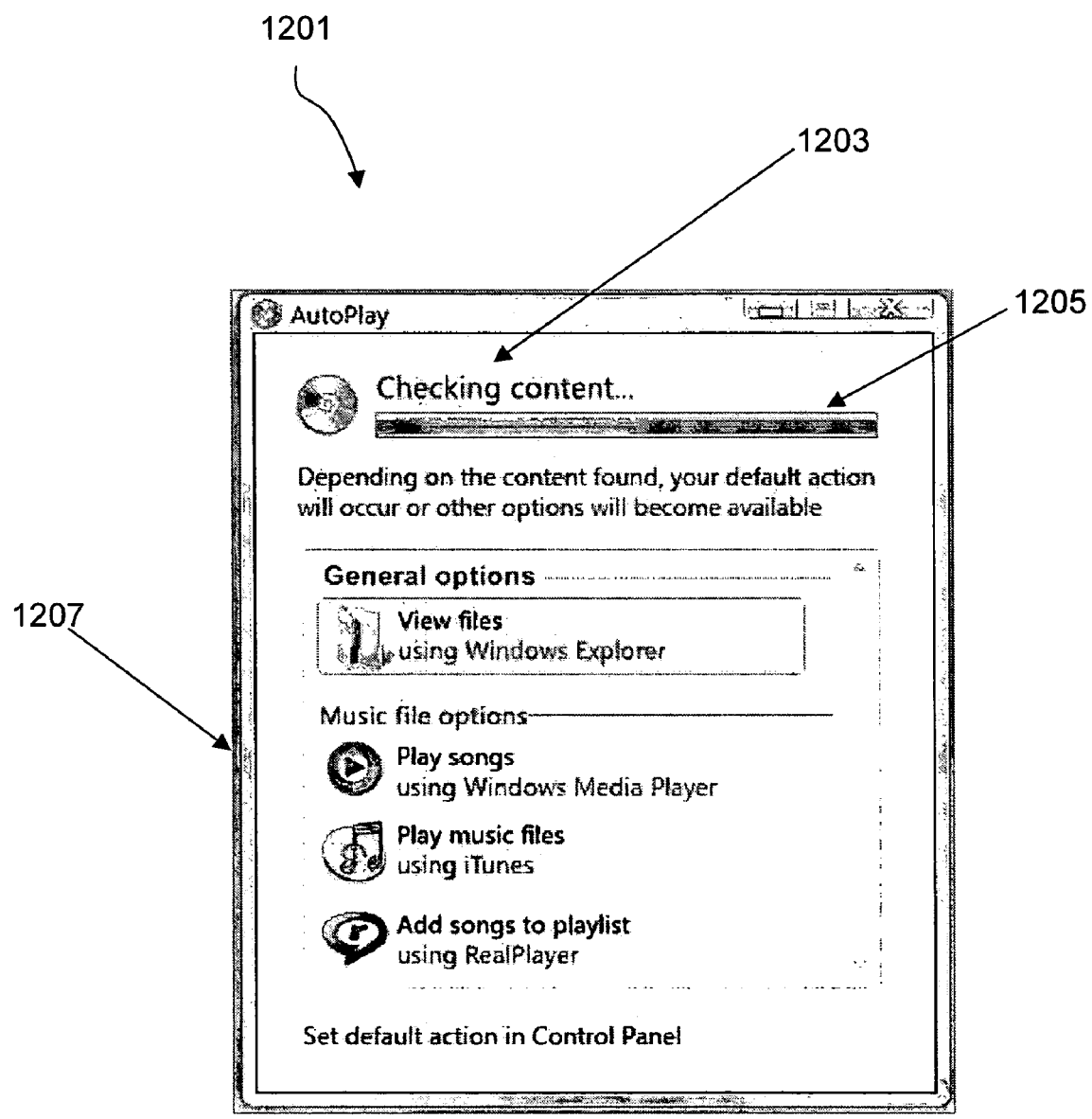
FIG. 12 illustrates a screenshot of a user interface relating to software program handlers based on a computer detecting new media content or a device detachably coupled to the computer, according to one or more illustrative aspects described herein.

FIG. 12 is a screenshot of an embodiment using asynchronous content scanning. Asynchronous content scanning refers to the idea that the AutoPlay prompt dialog 1201 can be populated with handlers and presented to the user before all of the media types on a media disk are known. In one embodiment of the invention, the handler list for a media disk is generated and displayed asynchronously, or while the media is searched. If the media disk is inserted into the CD-ROM drive of the computer, it may take at least a few seconds to "spin-up" the disk to begin searching the drive. Then, regardless of the physical form of the media (e.g. compact disk, flash drive, device, etc.), it may substantial time to search the entire media to determine all of the media types present. In one embodiment, the AutoPlay prompt dialog is presented to the user soon after the media disk is detected. Since the AutoPlay prompt dialog is presented before the entire disk is searched, the handler list initially presented to the user may be incomplete. If a new media type is discovered on the disk after the AutoPlay prompt dialog has already been presented, the handler list will be expanded to include registered handlers for the new media type. The message region 1203 and the progress bar 1205 displayed at the top of the AutoPlay prompt dialog 1201 indicate that the media disk is still being searched, and therefore additional default handler lists may still be added to the AutoPlay prompt dialog. The progress bar 1205 graphically illustrates the status of the review process while the message region 1203 provides text as to the status of the review process. In other arrangements, not shown, the progress bar 1205 may be provided without the message region 1203, or vice versa.

One embodiment relating to asynchronous content scanning allows the user to select a handler before the entire disk is scanned. This behavior is desirable when a user is familiar with the contents of the media disk and wants to quickly access an item by invoking a specific handler. In such a case, requiring the user to wait for the entire disk to be scanned causes an unwanted and unnecessary delay. Thus, the user may select a handler as soon as that handler is visible in the AutoPlay prompt dialog. However, as is shown in FIG. 12, the "Set Default" checkbox is not presented until the entire disk is scanned, and if the user selects a handler before the disk scan is complete, this handler will not be set as a default handler for the media type. The rationale for this behavior is that until the disk scan is complete, the exact content type of the media is not yet known, and it would therefore be inappropriate to set a default handler. When the disk scan completes, all the handler choices have therefore been presented in the handler list. At this point, if the disk is not identified as a mixed content media disk, then the "Set Default" checkbox will be displayed, and the user may set a default handler for the media type.

Another aspect of the invention relates to the expanding the handler list as new content types are found during the disk scan. The AutoPlay user interface 1201 is enclosed by a graphical border 1207, which is dynamically resized when new handlers are added to the list. Since one handler might be registered with multiple content types (e.g. Windows Media Player is a registered handler for both video files and audio files), there is a possibility of displaying duplicate handlers in the handler list. These duplicate handlers are generally undesirable because they lengthen the handler list 1403 unnecessarily and can confuse the user. Accordingly, in one embodiment, duplicate handlers are detected and removed from the handler list during the asynchronous content scanning process.

Another aspect of the invention relates to the scope of default handlers which are set for a content type. In one embodiment, global defaults are created for all volume devices based only on the content type of the media. For example, if a user sets the default handler for audio CDs inserted in the computer's CD-ROM drive, then the user inserts an audio CD into the DVD drive, the same audio CD default handler will be called. Thus, default handlers are global with respect to the content type of the media in volume drives.

Figure 13:
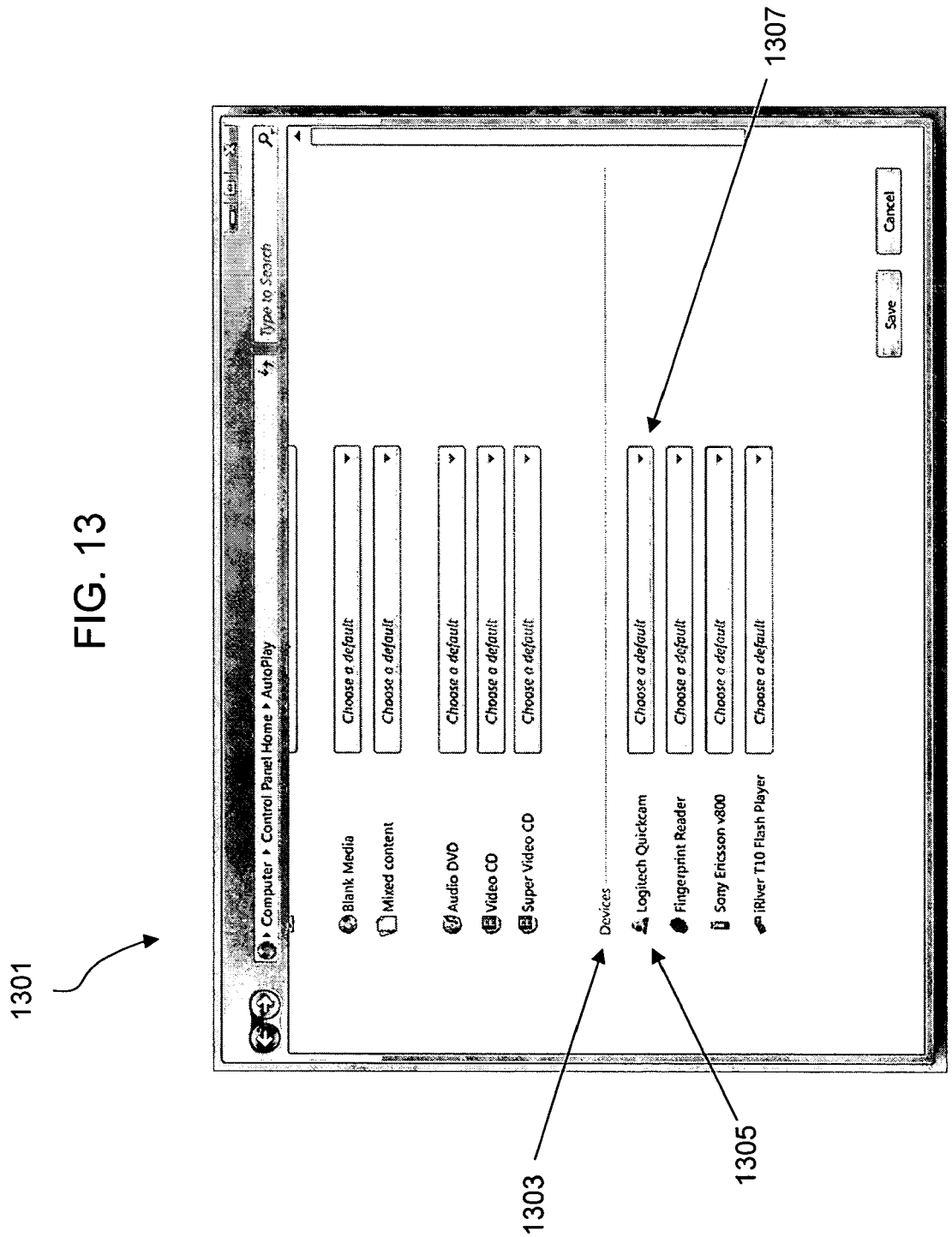
FIG. 13 illustrates a screenshot of a user interface relating to setting default software program handlers based on a computer detecting new media content or a device detachably coupled to the computer, according to one or more illustrative aspects described herein.

FIG. 13 is a screenshot showing an embodiment of the AutoPlay control panel 1301, which includes the list "Devices" 1303, consisting of the non-volume devices that have been attached to the computer. A non-volume device is any device which does not expose its content as a file system to the computer's operating system. In FIG. 13, the non-volume devices (e.g. Quickcam 1305) are presented below the content types in the AutoPlay control panel 1301, and each non-volume device has its own dropdown (e.g. menu 1307). Other examples shown of non-volume devices include a fingerprint reader, a mobile phone, and a memory music player. Therefore, each individual device can have its own default handler; default handlers from one device will not apply automatically to another non-volume device. Each non-volume device previously attached to the computer will have an entry in this list 1303; the device need not be currently plugged-in to appear in the AutoPlay control panel 1301. In one embodiment, the device list 1303 is sorted so that the most recently attached device is displayed at the top of the list, and so on. In another embodiment, the user can delete a specific device from the list 1303 using the features of the AutoPlay control panel user interface 1301. A deleted device will no longer appear in the devices list 1303, and will not have a default handler.

Figure 14:
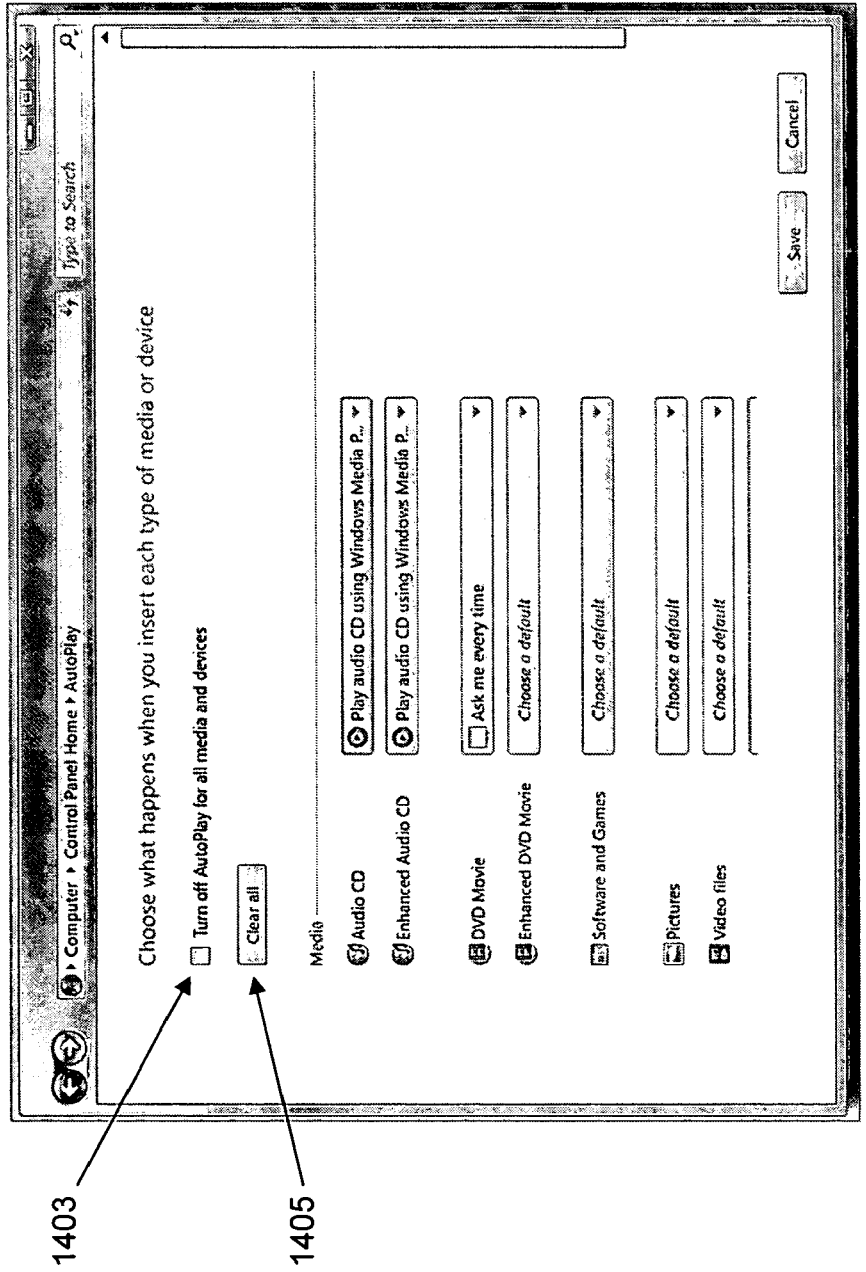
FIG. 14 illustrates a screenshot of a user interface relating to setting default software program handlers based on a computer detecting new media content or a device detachably coupled to the computer, according to one or more illustrative aspects described herein.

FIG. 14 is a screenshot showing another aspect of the AutoPlay control panel 1401, in certain embodiments of the invention. The "Turn off AutoPlay" checkbox 1403 is located near the top of the AutoPlay control panel 1401, and is accompanied by the text "Turn off AutoPlay for all media and devices." The checkbox 1403 represents a master switch that will turn off all AutoPlay functionality on the computer. When this checkbox 1403 is checked, the AutoPlay software will not respond to a new media or device arrival event. In other words, no software action will accompany hardware actions or the insertion of a new media into the computer; the AutoPlay prompt dialog will not be presented, and no handler will be called. The "Turn off AutoPlay" checkbox 1403 may allow a user to ensure that no software will be run on the computer unless explicitly called. This behavior can be desirable for computers operating in a very secure environment, or a performance-sensitive environment.

The "Clear All" button 1405 is also positioned near the top of the AutoPlay control panel 1401. The "Clear All" button 1405 removes the default handler for all media types and devices. Thus, all defaults handlers previously set by the user will be disregarded, and every dropdown in the AutoPlay control panel 1401 is set back to the hint text "Choose a default." In alternative embodiments, the "Turn off AutoPlay" checkbox 1403 and the "Clear All" button 1405 may be positioned in any location on the screen, and may be present in any alternative embodiment of the Autoplay control panel user interface 1401.

Figure 15:
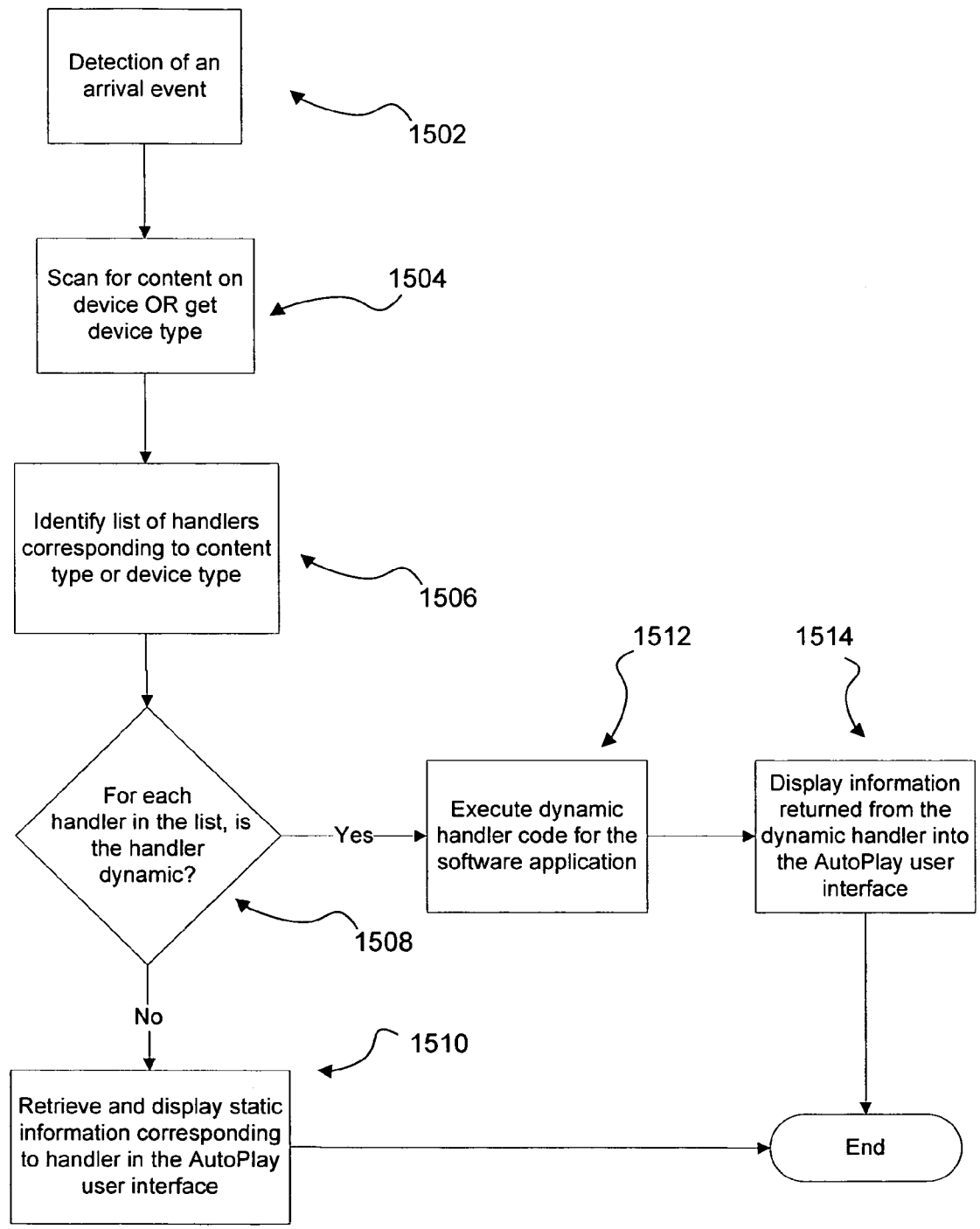
FIG. 15 illustrates a flow diagram illustrating the operation of AutoPlay functionality with dynamic handlers.

FIG. 15 is a schematic flow diagram illustrating the operation of dynamic handlers, another aspect of the present invention. Dynamic handlers allow the software applications which are compatible as handlers for certain media content types or device types to customize, or even remove, their corresponding handler in the AutoPlay user interface. In step 1502, an arrival event is detected by the computer's hardware infrastructure and operating system. As discussed in detail above, this arrival event indicates that a removable media or device has recently been inserted into the computer. In step 1504, the content type of the media or the specific device is determined by scanning the media or device. The list of handlers compatible with the specific content type or device is created in step 1506. As an example, if an audio CD was inserted into the CD-ROM drive of the computer, the handler list may consist of the handlers in the audio CD options list 305, as shown in FIG. 3.

In recursive step 1508, the AutoPlay program queries whether each handler in the identified handler list is a dynamic handler. A dynamic handler is one in which the software application corresponding to the handler has a specific software routine in place to provide information to the AutoPlay software upon the insertion of a compatible media content or device type into the computer. The dynamic handler routine is part of the application to be launched by the handler and is not part of the AutoPlay software. In one embodiment, all of the identified dynamic handlers are loaded individually into different "threads" or lightweight software processes, run by the AutoPlay program. The dynamic handlers may be run in separate threads from the AutoPlay user interface, ensuring that the user interface is not blocked by the execution of the dynamic handlers. In another embodiment, the dynamic handlers are executed in separate threads and run in parallel, rather than in sequence, to improve execution time.

Returning to FIG. 15, if a certain handler is found to be a dynamic handler in step 1508, the dynamic handler code is executed in step 1512 and the handler returns information to the AutoPlay user interface in step 1514. The dynamic handler code may execute to perform steps which, based on the current system context, provide customized information back to the AutoPlay application. If, on the other hand, the handler is found not to be a dynamic handler in step 1508, the AutoPlay program retrieves the static information associated with the handler and displays it in the AutoPlay user interface in step 1510.

As an example of the possible uses of dynamic handlers, in one embodiment, a potential handler application may use a dynamic handler to remove its handler or handlers from the AutoPlay prompt dialog, so that these handlers will not be visible to the user. This functionality may be useful to create a more coherent user experience on the computer. For example, if the user has disabled compact disk burning support on the computer, it would be desirable for the "Burn CD" handler to be removed from the Blank Media dropdown in FIG. 4, etc.

In another embodiment, dynamic handlers also allow a potential handler application to control its corresponding textual description displayed in the AutoPlay user interface. For example, a sync handler for portable device such as a mobile phone may want to display an option to "Setup Sync" the first time the device is connected. On subsequent occasions, when the device has already been set up for synchronization, the handler action text can be updated to read "Sync Now." Similarly, in yet another embodiment, the program may replace or remove the icons in its handlers.

The features described above provide a powerful yet easily usable set of tools for initiating software responses to hardware events. As described above, users can set a permanent default handler setting with a single keystroke. Further, the AutoPlay control panel user interface allows users a single coherent user interface to view or edit any default handler on the system. Further features, such as dynamic handlers and asynchronous content scanning further enhance a user's capabilities with respect to AutoPlay functionality.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. One or more computer-storage media comprising computer-executable instructions which, when executed on a computer system, performs a method of launching a software application, the method comprising:
   detecting a coupling of a detachable storage device with one or more types of media content to the computer system;
   determining that a default software application residing on the computer system has been selected for handling a first type of media content determined to be present on the detachable storage device, wherein the default software application is presently installed on the computer system and was selected prior to detecting the coupling;
   determining that one or more non-default software applications suitable for handling the first type of media content were installed on the computer system at a time when the default software application was selected;

determining that a new software application suitable for handling the first type of media content on the detachable storage device was installed on the computer system after the selection of the default software application; and displaying a user interface containing a first link to the default software application and a second link to the new software application on a display device, the user interface being void of links to the one or more non-default software applications, wherein a link to a software application is configured to launch the software application or a designated feature of the software application upon the user selecting the link.

2. The computer-storage media of claim 1, wherein said user interface is presented for a predetermined period of time, and the default software application is launched automatically if the user does not select the new software application within the predetermined period of time.

3. The computer-storage media of claim 2, wherein said user interface includes indicia identifying the default software application as a default and the new software application as newly installed.

4. The computer-storage media of claim 1, wherein upon a subsequent detection of a coupling of a detachable storage device in conjunction with a key-pressing action on a keyboard, providing a user interface including the default software application the new software application and at least one non-default software application.

5. The computer-storage media of claim 1, wherein said method further comprises presenting a control user interface providing a list of media content types and a selection control menu for each respective listed media content type.

6. The computer-storage media of claim 5, wherein the control user interface further includes a list of non-volume devices and a selection control menu for each respective listed non-volume device.

7. The computer-storage media of claim 5, wherein said user interface includes a selectable control element, which when selected resets all previous default software application settings for the listed media content types.

* * * * *